(12) United States Patent
Langford et al.

(10) Patent No.: US 9,041,264 B2
(45) Date of Patent: May 26, 2015

(54) AXIAL FLUX ELECTRICAL MACHINE

(75) Inventors: Charles Richard Langford, Grays Point (AU); Steven Peter Camilleri, Darwin (AU)

(73) Assignee: Regal Beloit America, Inc., Beloit, WI (US)

( * ) Notice: Subject to any disclaimer, the term of this patent is extended or adjusted under 35 U.S.C. 154(b) by 396 days.

(21) Appl. No.: 12/598,654

(22) PCT Filed: Apr. 29, 2008

(86) PCT No.: PCT/AU2008/000592
§ 371 (c)(1),
(2), (4) Date: Feb. 23, 2010

(87) PCT Pub. No.: WO2008/134797
PCT Pub. Date: Nov. 13, 2008

(65) Prior Publication Data
US 2010/0164313 A1    Jul. 1, 2010

(30) Foreign Application Priority Data

May 3, 2007 (AU) .............................. 2007902347

(51) Int. Cl.
*H02K 7/08* (2006.01)
*H02K 5/16* (2006.01)
*H02K 21/24* (2006.01)

(52) U.S. Cl.
CPC ............... *H02K 21/24* (2013.01); *H02K 7/083* (2013.01)

(58) Field of Classification Search
CPC .............................. H02K 21/24; H02K 7/083
USPC ....................................................... 310/90, 51
See application file for complete search history.

(56) References Cited

U.S. PATENT DOCUMENTS

| | | | | | |
|---|---|---|---|---|---|
| 3,568,962 | A | * | 3/1971 | Janssen | 384/536 |
| 3,624,434 | A | * | 11/1971 | Dafler et al. | 310/60 R |
| 3,714,705 | A | * | 2/1973 | Lewis | 29/596 |
| 3,900,232 | A | * | 8/1975 | Rode | 384/517 |
| 4,578,018 | A | | 3/1986 | Pope | |
| 4,980,587 | A | * | 12/1990 | Yonei et al. | 310/67 R |
| 5,452,157 | A | * | 9/1995 | Chow et al. | 360/98.08 |
| 5,574,322 | A | | 11/1996 | Nii et al. | |

(Continued)

FOREIGN PATENT DOCUMENTS

DE       197 01 797 A1      7/1997
DE    10 2006 024226 A1    11/2006

(Continued)

OTHER PUBLICATIONS

Translation of foreign document JP 11341734 A.*

(Continued)

*Primary Examiner* — Alex W Mok
(74) *Attorney, Agent, or Firm* — Armstrong Teasdale LLP

(57) ABSTRACT

An axial flux electrical machine including a housing, a stator located within the housing, a rotatable shaft carried by the housing by means of at least a main bearing, and a rotor fixed to the shaft within the housing. Magnetic attractive forces between the rotor and the stator produce an axial thrust on the main bearing and a biasing means (preferably in the form of a spring) is arranged to urge the shaft in a direction opposite to the axial thrust so as to reduce the net load on the main bearing. This reduction in net load on the main bearing increases bearing life and improves motor efficiency.

9 Claims, 2 Drawing Sheets

(56) References Cited

U.S. PATENT DOCUMENTS

| | | | | |
|---|---|---|---|---|
| 5,587,617 | A * | 12/1996 | Dunfield et al. | 310/90.5 |
| 5,598,048 | A * | 1/1997 | Dunfield et al. | 310/90.5 |
| 5,638,233 | A * | 6/1997 | Ishizuka | 360/99.09 |
| 5,945,766 | A * | 8/1999 | Kim et al. | 310/268 |
| 6,107,723 | A * | 8/2000 | Fujimoto | 310/323.09 |
| 6,262,505 | B1 * | 7/2001 | Hockney et al. | 310/90.5 |
| 2004/0061410 | A1 * | 4/2004 | Ando et al. | 310/218 |
| 2005/0206259 | A1 * | 9/2005 | Raszkowski | 310/90 |
| 2006/0279150 | A1 * | 12/2006 | Kojima et al. | 310/91 |
| 2007/0211976 | A1 * | 9/2007 | Fox et al. | 384/494 |

FOREIGN PATENT DOCUMENTS

| | | | | |
|---|---|---|---|---|
| EP | 1729396 | A1 | 12/2006 | |
| EP | 1 760 514 | A1 | 3/2007 | |
| JP | 53086411 | A * | 7/1978 | H02K 7/08 |
| JP | 686503 | | 3/1994 | |
| JP | 11341734 | A | 12/1999 | |
| JP | 2005 261022 | A | 9/2005 | |
| JP | 2006340537 | A | 12/2006 | |

OTHER PUBLICATIONS

Written Opinion of the International Searching Authority, PCT/AU2008/000592 mailed Jul. 10, 2009, 4 pages.

First Office Action from State Intellectual Property Office of The People's Republic of China; CN Application No. 200880018653.5 mailed Jul. 26, 2011; 5 pages, Beijing, CN.

International Search Report, PCT/AU2008/000592, Jul. 10, 2008.

Supplementary European Search Report in European Application No. 08 733 418, mailed Feb. 15, 2012, 5 pages.

English Translation of Office Action for JP Patent Application No. 2010-504383 mailed Apr. 17, 2012, 3 pages.

Communication, dated Feb. 5, 2013, from the European Patent Office for co-pending EP application No. EP08733418.1 (4 pgs).

Japanese Notice of Reasons for Rejection, and English-language translation, dated Nov. 26, 2012, for co-pending JP patent application No. 2010504383.

Decision of Final Rejection mailed Jul. 16, 2013; Japanese Patent Application No. 2010-504383, 3 pages.

* cited by examiner

AXIAL FLUX ELECTRICAL MACHINE

CROSS-REFERENCE TO RELATED APPLICATIONS

This application is a 35 U.S.C. §371 National Stage Application of PCT/AU2008/000592, filed Apr. 29, 2008, which claims priority to Australian Patent Application No. 2007902347, filed May 3, 2007, the entire content of each application is incorporated herein by reference.

FIELD OF THE INVENTION

The present invention relates generally to electrical machines and, in particular, to axial flux electrical machines. The invention is especially suited for use in axial flux electric motors and it will therefore be convenient to describe the invention with relation to that example application. It should be understood however that the invention is equally as applicable to axial flux generators.

BACKGROUND OF THE INVENTION

Electric motors generally require two bearings. Ideally, the bearings used are as low cost as possible. Of the rolling bearing family, deep-groove ball bearings are generally the lowest cost. Axial flux motors do not ideally suit this kind of bearing because a large amount of axial (or thrust) load is present on one bearing within an axial flux motor due to the large amount of attractive force between the rotor and stator. The more common radial flux motor structure does not have this issue, the force being reasonably balanced within the structure and thus not substantially loading the bearings. The high thrust load in an axial flux motor can decrease bearing life substantially, and is a known issue with axial flux machine technology.

Deep-groove ball bearings typically require some minimum axial force to be applied in order to operate more quietly and have an increased lifetime, known as a "pre-load" force. However, the axial force produced in an axial flux motor can be very much greater than a recommended pre-load force. Indeed, the axial load placed on a deep-groove ball bearing in an axial flux motor can significantly reduce the lifetime of the bearing.

It would therefore be desirable to provide some means by which the thrust load on the bearing could be reduced, but retain enough force for sufficient pre-load. This would significantly increase the life of the bearing in an axial flux machine, and thus significantly increase the useful life of the product incorporating it.

SUMMARY OF THE INVENTION

The present invention accordingly provides an axial flux electrical machine including:
 a housing;
 a stator located within the housing;
 a rotatable shaft carried by the housing by means of at least a main bearing;
 a rotor fixed to the shaft within the housing, wherein magnetic attractive forces between the rotor and the stator produce an axial thrust on the main bearing; and
 biasing means arranged to urge the shaft in a direction opposite to the axial thrust so as to reduce the net load on the main bearing.

The biasing means within the electrical machine may be connected directly or indirectly to the shaft of the machine so as to produce a force in a direction which is opposite to the axial thrust produced by the magnetic attractive forces between the rotor and the stator. This then serves to reduce the net load which is placed on the main bearing. In this way, the lifetime of the main bearing may be dramatically increased. An additional advantage is that the friction loss in the main bearing reduced due to the reduced load. This will improve motor efficiency.

In one embodiment, the machine includes a secondary bearing fixed to the shaft and supporting the shaft relative to the housing. The biasing means may include a spring positioned between the secondary bearing and the housing in such a way as to urge the secondary bearing and the shaft away from the primary bearing.

Preferably, the spring may be, or may include, a wave washer. Depending on the forces involved, two or more wave washers may be used.

In one embodiment, the housing includes an end shield and the secondary bearing is fixed to the shaft at a location outside of the end shield. The wave washer is then positioned between an outward facing surface of the end shield and the secondary bearing. In this way, the wave washer serves to push the secondary bearing, and the shaft to which it is connected, away from the main bearing.

The secondary bearing may be fixed to the shaft with a tight fit and may be supported by the end shield by means of a sliding fit. In this way, the secondary bearing, together with the shaft, can move in an axial direction in accordance with the force imposed on the bearing by the wave washer but will not move in a radial direction. The sliding fit should be sufficiently tight to prevent the outer housing of the bearing from rotating within the end shield under normal operating conditions.

So that the secondary bearing does not project beyond the end shield, the shield may include a recessed region surrounding a portion of the shaft in which the secondary bearing and wave washer may be located.

In a preferred embodiment, the biasing means substantially offsets the axial thrust due to the magnetic attractive forces between the rotor and the stator. The net load on the main bearing may then be substantially equal to the net load on the secondary bearing (although in the opposite direction). Under most circumstances, this configuration will provide maximum lifetime for the bearing set.

In a particularly preferred form of the electrical machine, the machine is a permanent magnet motor having a plurality of magnets fixed to the rotor.

A preferred embodiment of the invention will now be described with reference to the accompanying drawings. It should be understood that this embodiment is given by way of illustration only and the invention is not limited to this embodiment.

DETAILED DESCRIPTION OF A PREFERRED EMBODIMENT

Figure 1:
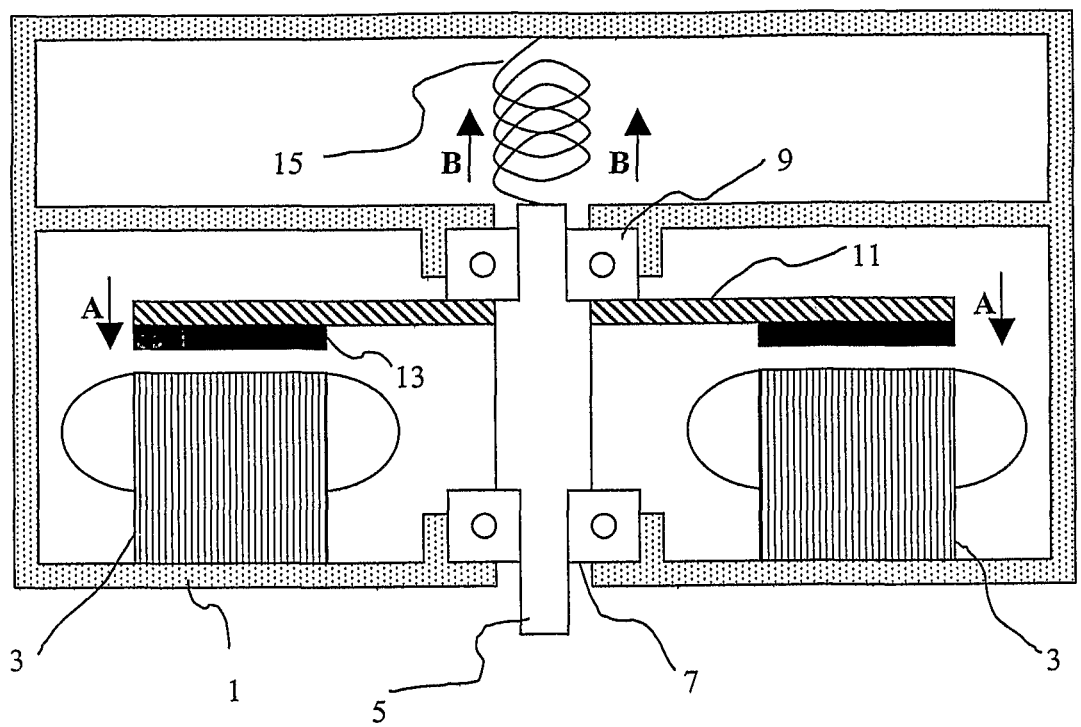
FIG. 1 shows a schematic representation of an axial flux electric motor which illustrates the principle of the present invention.

Referring initially to FIG. 1 of the drawings, there is shown a schematic representation of an axial flux direct current (DC) motor. The motor includes a housing 1, a stator 3 located within the housing 1, a rotatable shaft 5 carried by the housing 1 by means of a main bearing 7 and a secondary bearing 9. The motor also includes a rotor 11 fixed to the shaft 5 and has permanent magnets 13 attached to the rotor. Magnetic attractive forces between the magnets 13 on the rotor 11 and the stator 3 produce an axial thrust in the direction "A" on the main bearing 7. The motor further includes a biasing means, represented as a spring 15, which is arranged to urge the shaft 5 in the direction "B" so as to reduce the net load on the main bearing 7.

It will be appreciated from the somewhat idealised representation in FIG. 1 that the invention is based on the principle of applying a force to the shaft 5 in a direction which is opposite to the direction of the magnetic force. This may be achieved in a variety of ways, one of which is embodied in the motor shown in FIGS. 2 and 3.

Figure 2:
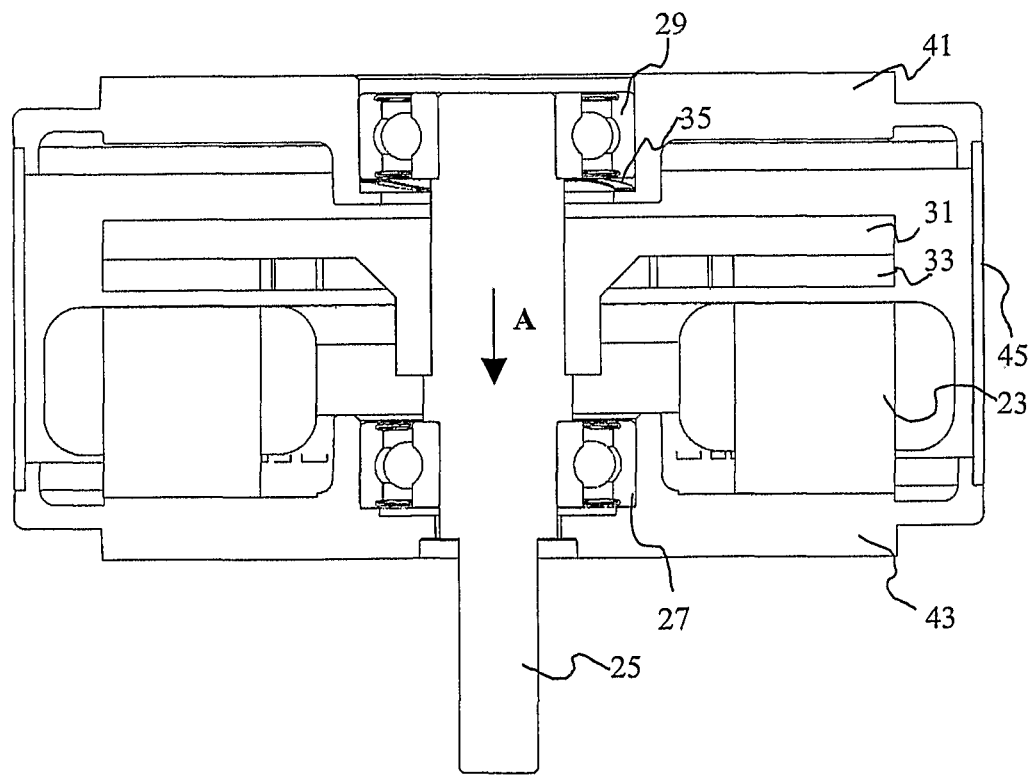
FIG. 2 shows a cross-sectional side view of an axial flux brushless direct current motor in accordance with a preferred embodiment of the invention.

Referring firstly to FIG. 2, there is shown a cross sectional side view of an axial flux, brushless DC motor in accordance with a preferred embodiment of the invention.

The motor shown in FIG. 2 includes a housing comprising a first end shield 41, a second end shield 43 and a tubular casing 45. A stator 23 is located within the housing and a shaft 25 is carried by the housing by means of a primary bearing 27 and a secondary bearing 29. Both bearings 27 and 29 are deep-groove ball bearings. A rotor 31 is fixed to the shaft 25 within the housing and a plurality of permanent magnets 33 are fixed to the rotor 31. Magnetic attractive forces between the rotor 31 and the stator 23 produce an axial thrust on the main bearing 27 in the direction marked "A".

Biasing means, in the form of a wave washer 35 located between an outward facing surface of the end shield 41 and the secondary bearing 29 serves to urge the secondary bearing 29, and the shaft 25 which is fixed thereto by a tight fit, away from the primary bearing 27. In other words, a force is applied to the shaft in a direction opposite to the direction marked "A". In this embodiment, the secondary bearing 29 and the wave washer 35 are located within a recessed region in the end shield 41.

Figure 3:
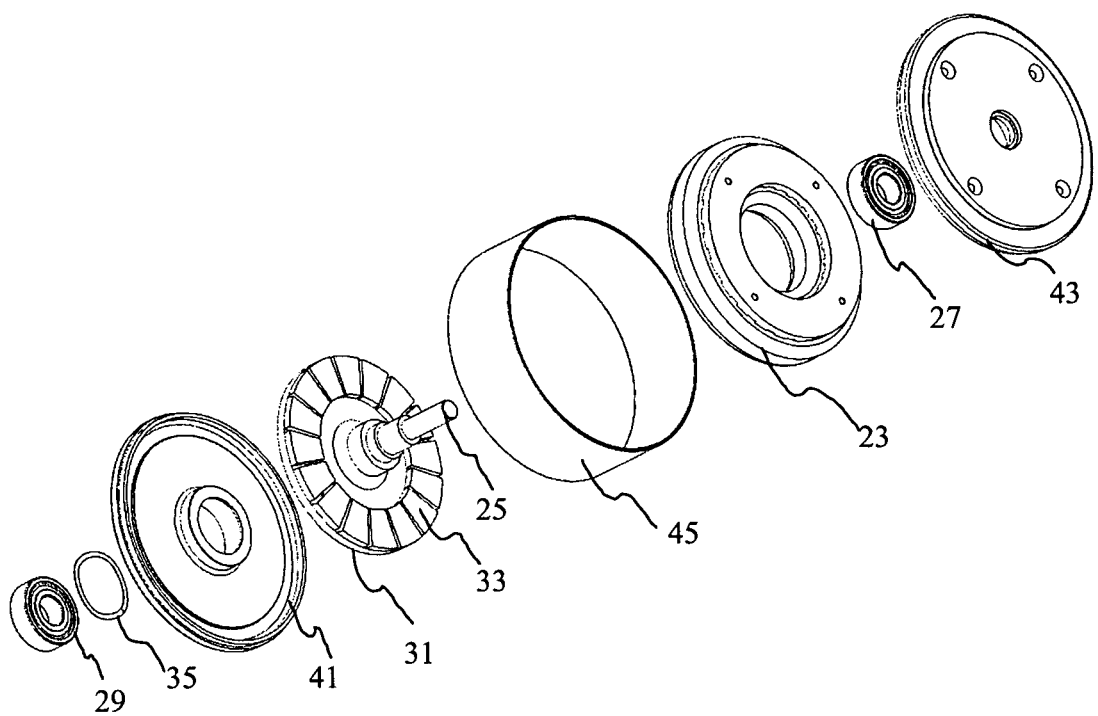
FIG. 3 shows an exploded perspective view of the motor shown in FIG. 2.

Referring now to FIG. 3, there is shown an exploded perspective view of the components of the motor shown in FIG. 2. Corresponding reference numerals have been used in FIG. 3 as were used in FIG. 2.

Assembly of the motor is in the order as shown in FIG. 3. The rotor 31 and shaft 25 are first assembled. End shield 41 is then placed on the rotor loosely in the orientation shown, ensuring that the recessed region located in the end shield 41 is concentric with shaft 25 by means of a locating jig. Wave washer 35 is then carefully placed into end shield 41 so that it rests within the recessed region. Bearing 29 is then pressed on to shaft 25 until it is located against the shoulder machined in the shaft 25. During this operation, the bearing also slides into the recessed region and partially compresses the wave washer 35. Once this is complete bearing 27 can be pressed on to the opposite end of the shaft 25. End shield 43 is then attached to stator 23 and case 45, and the resultant assemblies joined together to form the complete motor.

Figure 4:
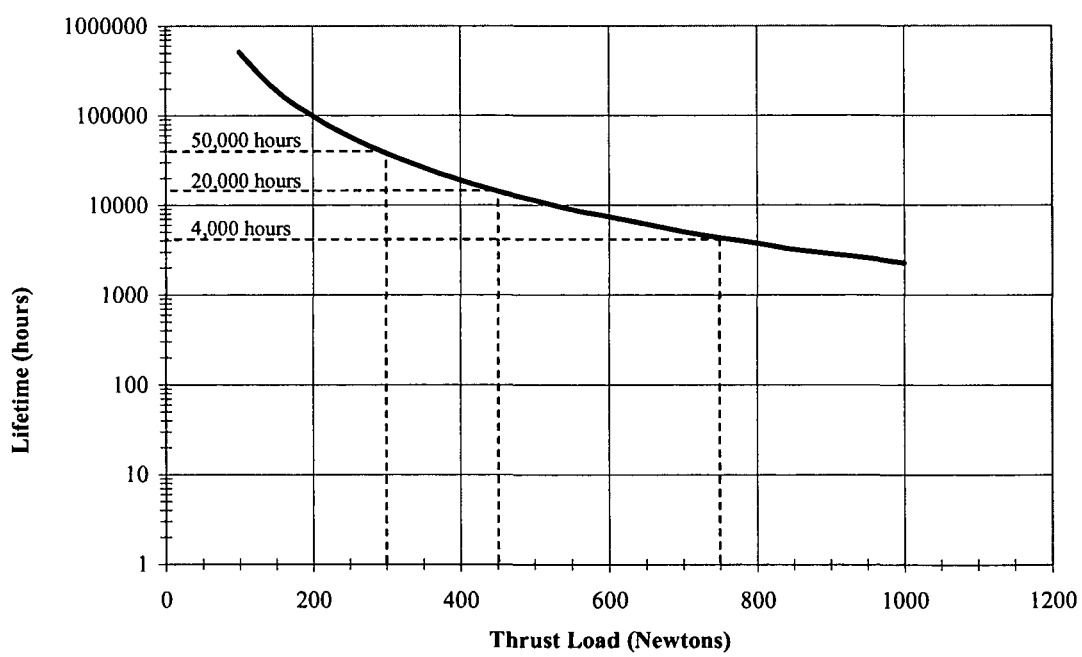
FIG. 4 shows a graph of anticipated bearing lifetime relative to thrust load on the bearing.

FIG. 4 shows a graph representing the expected lifetime of a deep-groove ball bearing at different thrust loads. In the case of this example, the magnetic load is 600 Newtons and the pre-load force on the secondary bearing is 150 Newtons. It can be seen that if the thrust load on the bearing is reduced from 750 Newtons to 450 Newtons by utilising the pre-loading bearing force to balance the magnetic force then the lifetime increases from 4,000 hours to 20,000 hours. This equates to a five-fold increase in bearing lifetime.

As a result of the invention, an adjustable combination of the following results is achieved:
  the lifetime of the motor and its reliability is increased
  the cost of the bearings used in the motor is decreased If, for example, the magnetic attractive force between the rotor and stator is 600 Newtons, a wave washer may be used to produce a force in the opposite direction of 300 Newtons. This would reduce the net load on the primary bearing to 300 Newtons and would apply a net load on the secondary bearing of 300 Newtons in the opposite direction. The two forces would therefore be balanced and the load on each bearing would be the same, thereby maximising the lifetime of each bearing and thus the lifetime of the motor. According to FIG. 4, this would be an increase fro 4,000 hours to 50,000 hours.

Although a preferred embodiment of the invention has been described herein in detail, it will be understood by those skilled in the art that variations may be made thereto without departing from the spirit of the invention or the scope of the appended claims.

The invention claimed is:

1. A single-sided axial flux electrical machine comprising:
   a housing having a first end and a second end opposite from the first end;
   a stator located within the housing and coupled to the housing at the first end;
   a main bearing coupled to the housing at the first end;
   a secondary bearing coupled to the housing at the second end such that an outer housing of the secondary bearing is prevented from rotation with respect to the housing;
   a rotatable shaft carried by the housing via the main bearing and the secondary bearing, the shaft extending through the stator, the shaft rotatably coupled to the housing at the second end via the secondary bearing and protruding from the housing at the first end, the shaft defining a rotation axis;
   a single rotor fixed to the shaft within the housing between the secondary bearing and the stator, wherein magnetic attractive forces between the rotor and the stator produce an axial thrust on the main bearing; and
   at least one biasing device arranged between the secondary bearing and the housing second end, the at least one biasing device contacting the housing to urge the secondary bearing and the shaft away from the main bearing in a direction opposite to the axial thrust so as to reduce the net load on the main bearing.

2. The machine of claim 1 wherein the biasing device comprises a spring positioned between the secondary bearing and the housing to urge the secondary bearing and the shaft away from the main bearing.

3. The machine of claim 2 wherein the spring comprises at least one wave washer.

4. The machine of claim 2 wherein the housing includes an end shield and the secondary bearing is fixed to the shaft at a location outside of the end shield, with the spring being positioned between an outward facing surface of the end shield and the secondary bearing.

5. The machine of claim 4 wherein the secondary bearing is fixed to the shaft by means of a tight fit and is supported by the end shield by means of a sliding fit.

6. The machine of claim 4 wherein the end shield includes an outward facing recessed region surrounding a portion of the shaft and the secondary bearing and the biasing device are located within the recessed region.

7. The machine of claim 1 wherein the biasing device substantially offsets the axial thrust due to the magnetic attractive forces between the rotor and the stator, and the net load on the main bearing is substantially equal to the net load on the secondary bearing.

8. The machine of claim 1 wherein the rotor comprises a plurality of permanent magnets.

9. A method of assembling a single-sided axial flux electrical machine, said method comprising:
- providing a housing having a first end and a second end opposite from the first end;
- providing a stator within the housing and coupled to the housing at the first end;
- coupling a main bearing to the housing at the first end;
- coupling a secondary bearing to the housing at the second end such that an outer housing of the secondary bearing is prevented from rotation with respect to the housing,
- carrying a rotatable shaft by the housing via the main bearing and the secondary bearing, the shaft extending through the stator, the shaft rotatable coupled to the housing at the second end via the secondary bearing and protruding from the housing at the first end, the shaft defining a rotation axis;
- coupling a single rotor to the shaft within the housing between the secondary bearing and the stator, wherein magnetic attractive forces between the rotor and the stator produce an axial thrust on the main bearing; and
- providing at least one biasing device arranged between the secondary bearing and the housing second end, the at least one biasing device contacting the housing to urge the secondary bearing and the shaft away from the main bearing in a direction opposite to the axial thrust so as to reduce the net load on the main bearing.

* * * * *